(12) United States Patent
Tanner

(10) Patent No.: US 8,629,618 B1
(45) Date of Patent: Jan. 14, 2014

(54) BACKUP LIGHTING APPARATUS

(76) Inventor: Christopher Tanner, Lyles, TN (US)

( * ) Notice: Subject to any disclaimer, the term of this patent is extended or adjusted under 35 U.S.C. 154(b) by 0 days.

(21) Appl. No.: 13/596,286

(22) Filed: Aug. 28, 2012

(51) Int. Cl.
    *H05B 37/00* (2006.01)
    *H05B 41/14* (2006.01)

(52) U.S. Cl.
    USPC ............. 315/86; 315/149; 315/155; 315/362

(58) Field of Classification Search
    None
    See application file for complete search history.

(56) References Cited

U.S. PATENT DOCUMENTS

| | | | |
|---|---|---|---|
| 5,493,618 A | 2/1996 | Stevens et al. | |
| 6,278,366 B1 | 8/2001 | Fletcher et al. | |
| 6,528,954 B1 * | 3/2003 | Lys et al. | 315/291 |
| 6,999,923 B1 | 2/2006 | Ablondi et al. | |
| 7,211,959 B1 | 5/2007 | Chou | |
| 7,378,976 B1 | 5/2008 | Paterno | |
| 7,400,226 B2 | 7/2008 | Barrieau et al. | |
| 7,520,635 B2 * | 4/2009 | Wolf et al. | 362/276 |
| 8,120,470 B2 | 2/2012 | Kitaura | |
| 8,189,430 B2 | 5/2012 | Kitaura | |
| 2004/0257236 A1 | 12/2004 | Klemish | |
| 2006/0227640 A1 | 10/2006 | Herschaft et al. | |
| 2012/0098655 A1 * | 4/2012 | Preta et al. | 340/438 |

* cited by examiner

*Primary Examiner* — Anh Tran
(74) *Attorney, Agent, or Firm* — Dale J. Ream

(57) ABSTRACT

A backup lighting apparatus includes a light housing having a conductive base selectively connected to a light socket and a bulb portion extending upwardly therefrom that defines an interior area. A processor, battery, light, and audio sensor are situated in the interior area. The audio sensor is configured to detect a predetermined sound. Another sensor in the interior area is configured to detect a power outage and if a light switch is in an "on configuration." The processor causes the battery to energize the light if a power outage is detected, the light switch is "on," and a predetermined sound—such a hand clap—is detected. Accordingly, only a room in which a light was already on when an outage occurred and in which a person is present and signals for a backup is illuminated, such that electricity and battery power is conserved.

12 Claims, 5 Drawing Sheets

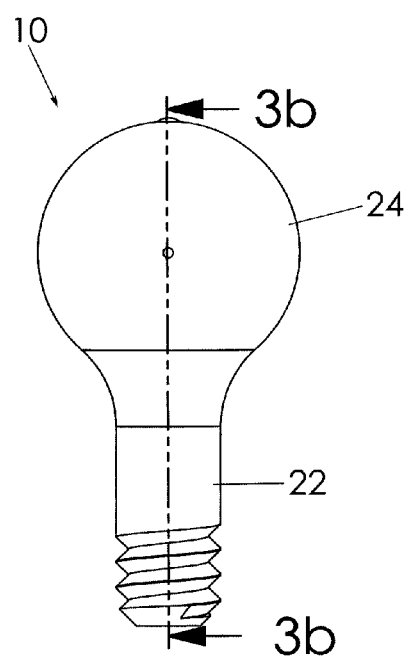
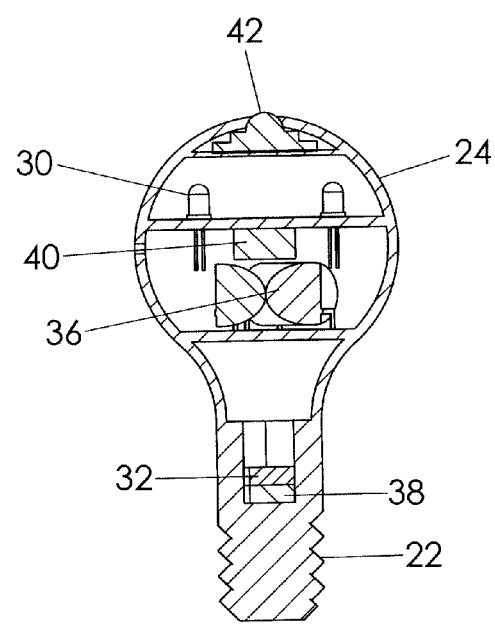
Fig. 3a
Fig. 3b

US 8,629,618 B1

BACKUP LIGHTING APPARATUS

BACKGROUND OF THE INVENTION

This invention relates generally to illumination devices and, more particularly, to a battery backup lighting device that is only activated in a power outage if an associated light switch is in an "on" configuration and either a predetermined sound or motion is detected.

Power outages occur when electricity is interrupted due to lightning strikes from storms or simple failure of components somewhere an electric grid infrastructure. When all of the electricity to a house or business is lost during nighttime hours, the suddenness and completeness of darkness can cause major inconveniences, safety concerns, and even fear. Residents often have to scramble in the darkness to locate a flashlight or, in a longer term outage, for a generator to generate power to power lights.

Various devices and systems have been proposed in the art for immediately restoring all power to a residence or business when a power outage is experienced. Such systems may automatically tap an alternative energy source, such as battery or generator, to energize all lights that were previously turned on. Although assumably effective for their intended purposes, the existing systems may result in a waste of energy in that lights in unoccupied rooms or in rooms that become unoccupied may be energized. For instance, all lights in a residence or business need not be energized by backup power if no person is in some or all of the affected rooms experiencing the power outage. In other words, the existing systems and proposals are not room-by-room specific to the power outage, are not confirmed to being occupied, or are not dependent upon the request of a user to be energized by alternative or back-up power. In today's increased energy-conservation consciousness, the existing proposals and products are undesirable.

Therefore, it would be desirable to have a backup lighting apparatus that provides backup power to energize a light source only when the power outage is confirmed, when an associated light switch is confirmed to be in an "on" configuration, and when sensors detect that the associated room is occupied and the occupant has requested backup power be energized. Further, it would be desirable to have a backup lighting apparatus that saves energy by not automatically energizing backup power when an outage is detected.

SUMMARY OF THE INVENTION

A backup lighting apparatus according to the present invention includes a light housing having a conductive base configured to be conductively connected to a light socket and a bulb portion extending upwardly from the base that defines an interior area. A processor, battery, light, and audio sensor are situated in the interior area. The audio sensor is configured to detect a predetermined sound. The apparatus includes a memory in communication with the processor and includes programming. Another sensor in the interior area is configured to detect a power outage and if a light switch is in an "on configuration." The processor causes the battery to energize the light if a power outage is detected, the light switch is "on" and a predetermined sound—such a hand clap—is detected. Accordingly, only rooms in which lights were already on when an outage occurred, in which a person is present and calls for a backup are illuminated, such that electricity and battery power is conserved.

Therefore, a general object of this invention is to provide a backup lighting apparatus that is configured to energize a light using battery power when a room serviced by the lighting apparatus is occupied, was "on" at the time of a power outage, and is requested by an occupier of the room.

Another object of this invention is to provide a backup lighting apparatus, as aforesaid, that conserves energy usage by only energizing lights using backup power under predetermined conditions.

Still another object of this invention is to provide a backup lighting apparatus, as aforesaid, in which sensors, backup power source, and sensors are situated inside a light housing.

Yet another object of this invention is to provide a backup lighting apparatus, as aforesaid, that is as easy to install in a light socket as a traditional light bulb.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 3a is a side view of the backup lighting apparatus as in FIG. 1;

FIG. 3b is a sectional view taken along line 3b-3b of FIG. 3a;

DESCRIPTION OF THE PREFERRED EMBODIMENT

Figure 1:
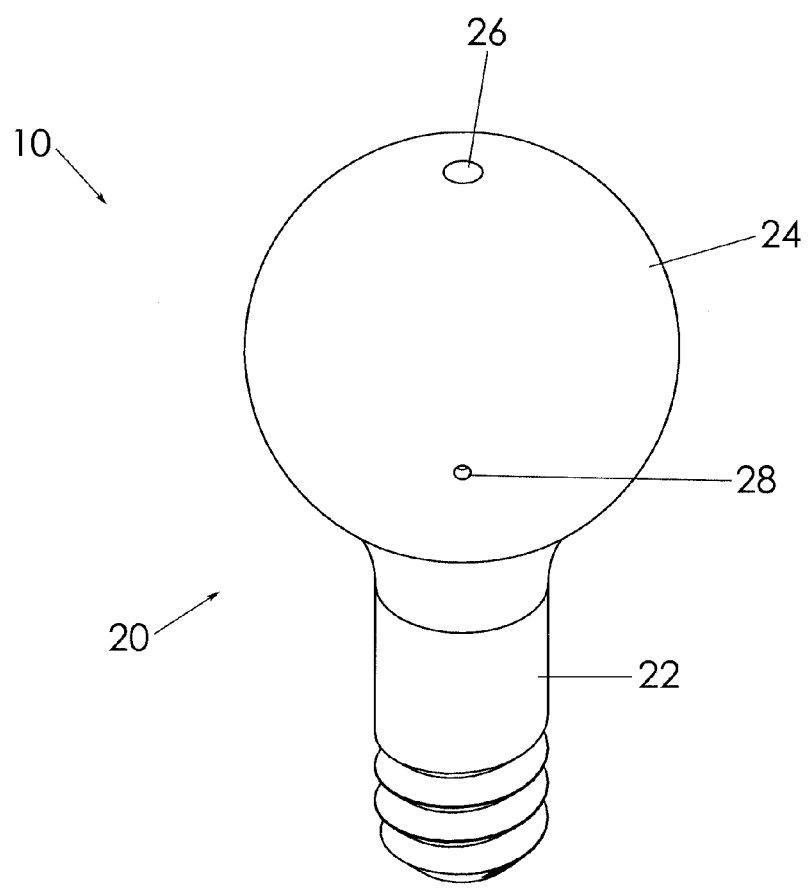
FIG. 1 is a perspective view of a backup lighting apparatus according to a preferred embodiment of the present invention.
Figure 2:
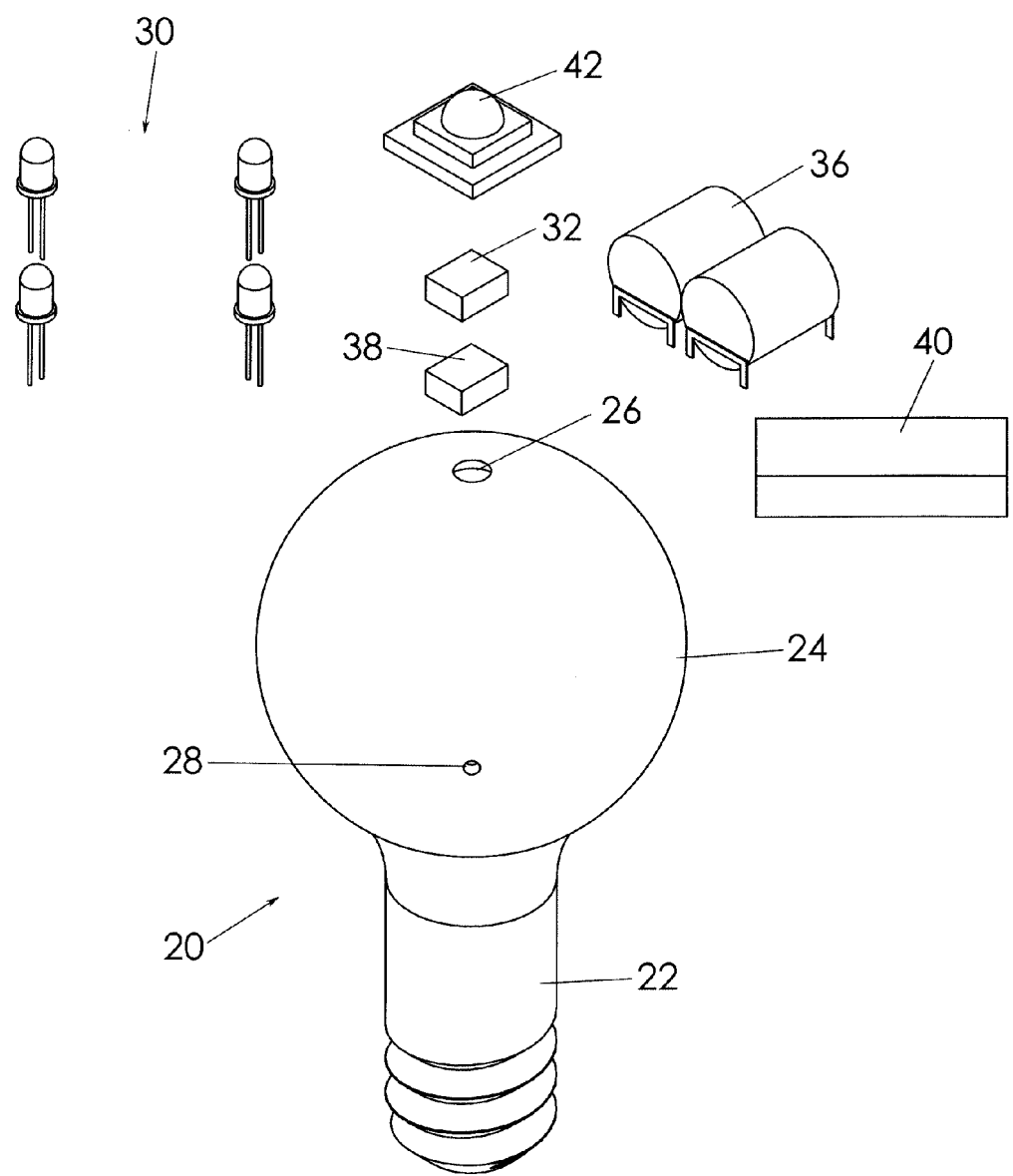
FIG. 2 is an exploded view of the backup lighting apparatus as in FIG. 1.

A backup lighting apparatus according to a preferred embodiment of the present invention will be described in detail with references to FIGS. 1 to 5 of the accompanying drawings. The backup lighting apparatus 10 includes a light housing 20 configured for electrical engagement with a light socket and electronics housed with an interior area thereof as will be described below.

The present invention is for use in either a residential or commercial building environment that includes electrical sockets of a type configured to receive light bulbs. It is understood that each electrical socket is electrically connected to an electrical power source such as a traditional electricity grid. Each electrical socket is associated with at least one actuation switch (i.e. a light switch) that is movable between an "on configuration" that allows electricity from the power source to flow through the actuation switch to the associated light socket.

The backup lighting apparatus 10 includes a light housing 20 having a conductive base portion 22 that is configured to be operatively, removably, and conductively connected to a light socket so as to receive electric current therefrom when the light socket is energized, i.e. when the light actuation switch is in an "on" configuration. More particularly, the base portion 22 may include a threaded configuration constructed of aluminum or other conductive metal material.

The lighting apparatus 10 includes a glass bulb portion 24 coupled to the base portion 22 and extends away therefrom. The bulb portion 24 preferably includes a generally domed configuration in the traditional manner of incandescent light bulbs. The bulb portion 24 defines an interior area configured to surround and contain various electronic components as will be described below. An exemplary arrangement of the electronic components is illustrated in FIG. 3b). In addition, the bulb portion 24 may be constructed of glass and include a transparent or translucent configuration such that light may pass therethrough.

An illumination source, which may also be referred to merely as a light 30, is positioned in the interior area of the bulb portion 24. Preferably, the illumination source is a plurality of light emitting diodes ("LED") although an incandescent or fluorescent light may also be suitable. An LED is advantageous as the air within the bulb portion 24 need not be an inert gas as is typical in a traditional incandescent light bulb. The light 30 may be electrically connected to the conductive base portion 22 with one or more wires (not shown). The LEDs may be white, colored, or a combination of colors.

Figure 4:
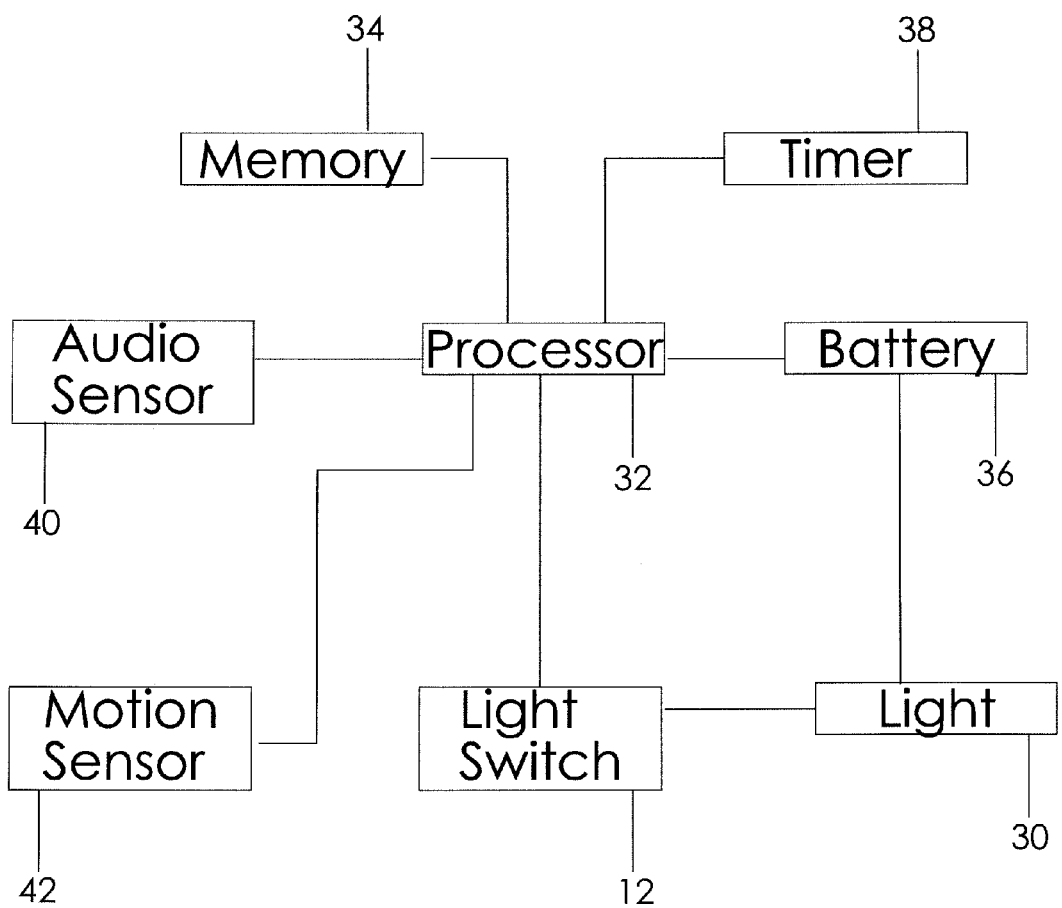
FIG. 4 is a block diagram of the electronic components of the backup lighting apparatus as in FIG. 1.

A processor 32 or suitable logic controller may be situated in the interior area of the light housing 20 and is operatively connected to the conductive base portion 22 so as to receive electrical current therefrom when energized (electrical wiring or solder connections not shown in the illustrations). It is understood that the processor 32 may be the primary electrical connector to the base portion 22 such that all of the other electrical components described herein may be coupled to the processor 32 to receive power (FIG. 4). The processor 32 may be directly connected to the light 30 or may be indirectly connected thereto by being first connected to a battery 36 as disclosed below. A memory 34 component may also be situated in the interior area and in data communication with the processor 32. The memory 34 includes programming instructions to be executed by the processor 32 as will be described later.

A battery 36 is situated in the interior area and in electrical communication with the processor 32 and with the light 30. The battery 36 may include a pair of battery cells so as to provide about 2.5 hours of electrical current to power the light 30 when actuated by the processor 32 to do so.

One or more sensors may also be situated in the interior area of the bulb portion 24 of the light housing 20. More particularly, an audio sensor 40 may be positioned in the interior area and in data communication with the processor 32. The audio sensor 40 is configured to detect audible sounds and to communicate audio data to the processor 32 where it is processed according to programming instructions as will discussed in more detail later.

A motion sensor 42 may also be positioned in the bulb portion interior area and in data communication with the processor 32. The motion sensor 42 is configured to detect movement away from the light housing 20 and to communicate motion data to the processor 32 where it may be processed according to programming instructions.

A power sensor may also be positioned in the bulb portion interior area and in data communication with the processor 32. The power sensor may also be configured to communicate with the actuation switch so as to determine if the switch is in the "on configuration" and also if there is a complete power outage. More particularly, the power sensor may include a circuit, such as an electrical wiring loop, that extends between the battery 36, the processor 32, and the actuation switch 12. The battery 36 may be configured to transmit a test current (presumably under programming control initiated by the processor 32) through the circuitous wire loop. If the test current is returned to the processor in a predetermined amount of time, then it is indicated that the actuation switch is in the "on configuration." In electrical terms, a return of the test current indicates that the electrical circuit is "closed" so as to allow current to flow from the electricity source to the respective electrical socket. It is also understood that the electrical wiring loop may be configured to test if electrical current is available on the "hot side" of the actuation switch 12 so as to indicate if current is available from the electricity source or if a power outage has occurred. The power sensor may be seen in FIG. 4 as the lines interconnecting the components described above, it being understood that the processor 32, under programming control, is capable of initiating and interpreting test current data.

In another aspect of the invention, the bulb portion 24 may define one or more openings to enhance data received by respective sensors. More particularly, an upper end of the bulb portion 24 may define what will be referred to herein as a motion aperture 26. The motion sensor 42 is positioned within the interior area generally adjacent the motion aperture 26 and oriented in alignment therewith such that motion outside the bulb portion may be detected efficiently by the motion sensor 42. Similarly, the bulb portion 24, such as a side panel thereof, may define what will be referred to herein as an audio aperture 28. Preferably, the audio sensor 40 is positioned within the interior area generally adjacent the audio aperture 28 and oriented in alignment therewith such that sounds outside of the bulb portion 24 may be detected efficiently by the audio sensor 40.

The lighting apparatus 10 may include a timer circuit 38 positioned in the interior area of the bulb portion 24 of the light and electrically connected to the processor 32. The timer circuit 38 is configured to measure a predetermined amount of time when actuated to do so. For example, the timer circuit 38 may be configured to count up to a predetermined number or to count down to zero from a predetermined starting number. As will be described in more detail below, the timer circuit 38 enables the lighting apparatus 10 to de-energize the light 30 after a predetermined amount of time after being energized and, therefore, save energy in the event a room has become unoccupied.

Figure 5:
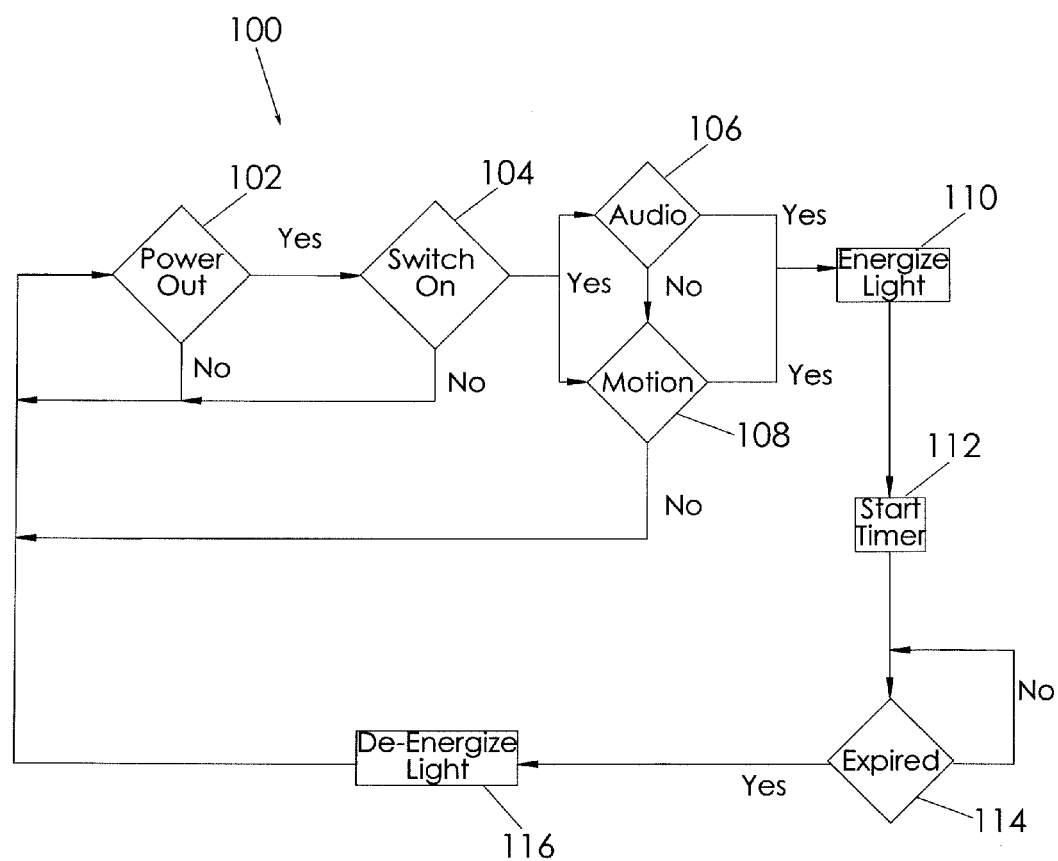
FIG. 5 is a flow chart illustrating the logic of the processor of the backup lighting apparatus.

Operation of the backup lighting apparatus 10 according to an exemplary process or methodology 100 will now be described below. The sensors 40, 42 provide data to the processor 32 and the processor 32 actuates certain actions according to execution of programming instructions in memory 34. Therefore, it is understood that the flowchart shown in FIG. 5 represents the logic executed by the processor 32 under program control. Specifically, the power outage sensor determines if a power outage exists and delivers data to the processor 32 accordingly, namely, if electrical current is no longer available from the power source. The power outage sensor may also be configured to detect if the associated light actuation switch is in an "on configuration. And, as described above, the motion sensor 42 and audio sensor 40 detect if movement and sound has occurred outside the light housing 20, respectively. All of this data is provided to the processor 32.

If the processor 32, executing programming at step 102, determines that a power outage exists, the process 100 proceeds to step 104. Otherwise, the process 100 returns to step 102. At step 104, the processor 32 determines if data from the sensors is indicative that an associated actuation switch is in the "on" configuration and, if so, the process 100 proceeds in parallel to steps 106 and 108. Otherwise, the process 100 returns to step 102. At step 106, the processor 32 determines if a predetermined audible sound has been detected by the audio sensor 40 and, if so, proceeds to step 110. Otherwise, control is directed to step 108. At step 108, the processor 32 determines if motion has been detected by the motion sensor 42 and, if so, proceeds to step 110. Otherwise, control is directed to step 102. It is observed that in this case, a power outage has been detected but either the associated switch is in an "off configuration" or, even if in an "on configuration," there is no indication that the room is occupied or that a user has requested a battery backup.

At step 110, the processor 32 actuates the battery 36 to energize the light 30 within the bulb portion interior area and the process 100 proceeds to step 112. At step 112, the processor 32 actuates the timer circuit 38 to measure a predetermined amount of time and the process 100 proceeds to step 114. At step 114, the processor 32 determines if the timer has expired and, if so, the process 100 proceeds to step 118. Otherwise, the process 100 returns to step 114 and monitoring of the timer is continued. At step 116, the light 30 is de-energized, such as by preventing current from the battery 36 from flowing to the light 30. The process 100 is then returned to step 102 to once again determine if the power outage continues.

In another embodiment of the present invention, a plurality of lighting apparatuses 10 may be included in a larger lighting system (not shown). By contrast with traditional lighting systems, a power outage typically results in all lights that are switched on at the moment of the power outage being re-energized by backup power—such as power from a generator. Applying the structure and process disclosed above, it is clear that only those lights that are switched on and for which motion or a predetermined audible sound is detected are re-energized with backup power. In other words, backup power is "room specific." In some embodiments, backup power may only provided if both audio and motion are detected so as to indicate that a room is both occupied and that backup lighting is actually desired.

Accordingly, the present backup lighting apparatus 10 provides backup lighting only under specific conditions and for a predetermined amount of time so that energy is not wasted at the point of initiation or for a potentially unnecessary duration of time.

It is understood that while certain forms of this invention have been illustrated and described, it is not limited thereto except insofar as such limitations are included in the following claims and allowable functional equivalents thereof.

The invention claimed is:

1. A backup lighting apparatus for use with a light socket that is electrically connected to an electricity source and to an actuation switch configured to move selectively between an "on configuration" that allows current from the electricity source to flow therethrough and an "off configuration" that prevents the current from the electricity source to flow therethrough, said backup lighting apparatus, comprising:
   a light housing having a conductive base configured to be conductively connected to the light socket and a bulb portion extending upwardly from said base that defines an interior area;
   a processor positioned in said interior area of the light housing bulb portion and electrically connected to said conductive base;
   a battery positioned in said interior area of the light housing bulb portion and electrically connected to said processor;
   a light positioned in said interior area of the light housing bulb portion and electrically connected to said processor;
   an audio sensor positioned in said interior area of the light housing bulb portion and electrically connected to said processor that is configured to detect a predetermined audio sound;
   a power sensor configured to determine if current is available from the electricity source and if the actuation switch is in the "on configuration." programming that when executed by said processor determines if electrical current is available from the electricity source;
   programming that when executed by said processor determines if the actuation switch is in the "on configuration;"
   programming that when executed by said processor determines if a predetermined audible sound is received by said audio sensor; and
   programming that when executed by said processor causes said processor to actuate said battery to energize said light when said processor has determined that the actuation switch is in the "on configuration" and that current is not available from the electricity source and that said audio sensor has detected said predetermined audio sound.

2. The backup lighting apparatus as in claim 1, further comprising:
   a motion sensor positioned in said interior area of said light housing configured to detect motion outside said light housing; and
   programming that when executed by said processor causes said battery to energize said light when said processor has determined that the actuation switch is in the "on configuration" and that current is not available from the electricity source and that said motion sensor has detected motion outside of said light housing.

3. The backup lighting apparatus as in claim 1, further comprising:
   a motion sensor positioned in said interior area of said light housing configured to detect motion outside of said light housing; and
   programming that when executed by said processor causes said battery to energize said light when said processor has determined (1) that the actuation switch is in the "on configuration" and (2) that current is not available from the electricity source and (3) that said audio sensor has detected said predetermined audible sound and (4) that said motion sensor has detected motion outside of said light housing.

4. The backup lighting apparatus as in claim 1, wherein said bulb portion is one of transparent and translucent.

5. The backup lighting apparatus as in claim 3, wherein said bulb portion is one of transparent and translucent.

6. The backup lighting apparatus as in claim 2, wherein:
   said bulb portion defines at least one motion aperture; and
   said motion sensor is positioned adjacent said at least one motion aperture and operatively oriented to detect motion away from said at least one motion aperture.

7. The backup lighting apparatus as in claim 1, wherein:
   said bulb portion defines at least one audio aperture; and
   said audio sensor is positioned adjacent said at least one audio aperture and operatively oriented to detect audible sound through said audio aperture.

8. The backup lighting apparatus as in claim 1, further comprising:
   a timer circuit positioned in the interior area of the light housing bulb portion and electrically connected to said processor;
   programming in said memory that when executed by said processor causes said timer circuit to measure a predetermined amount of time; and
   programming in said memory that when executed by said processor determines if said predetermined amount of time has been reached and, if so, causes said battery to de-energize said light.

9. The backup lighting apparatus as in claim 1, wherein said light is a light emitting diode.

10. The backup lighting apparatus as in claim 1, wherein said light is a plurality of light emitting diodes.

11. The backup lighting apparatus as in claim 1, wherein said power sensor includes a circuit that is electrically connected to said battery, said processor, and the actuation switch, said circuit configured to actuate a test current from said battery such that a return of said test current to said processor is indicative of the actuation switch being in the "open configuration" and current from the electricity source being available.

12. The backup lighting apparatus as in claim 11, wherein said circuit includes a circuitous wire loop.

\* \* \* \* \*